United States Patent
Stocchiero (10) Patent No.: US 6,645,661 B2
(45) Date of Patent: Nov. 11, 2003

(54) SEAL AND BLEED VALVE UNIT FOR ELECTRIC BATTERIES

(76) Inventor: Franco Stocchiero, Via Giacomo Zanella, 34/A - 36050, Montorso Vicentino (VI) (IT)

(*) Notice: Subject to any disclaimer, the term of this patent is extended or adjusted under 35 U.S.C. 154(b) by 141 days.

(21) Appl. No.: 09/979,882

(22) PCT Filed: Apr. 19, 2001

(86) PCT No.: PCT/EP01/04419
§ 371 (c)(1),
(2), (4) Date: Nov. 27, 2001

(87) PCT Pub. No.: WO01/82395
PCT Pub. Date: Nov. 1, 2001

(65) Prior Publication Data
US 2002/0160254 A1 Oct. 31, 2002

(30) Foreign Application Priority Data
Apr. 20, 2000 (IT) .................. V12000A0072

(51) Int. Cl.[7] .................................................. H01M 2/12
(52) U.S. Cl. ............................... 429/53; 141/302
(58) Field of Search ................ 429/53–56; 141/67, 141/302, 351

(56) References Cited

U.S. PATENT DOCUMENTS 4,576,879 A * 3/1986 Nakazawa .................. 429/86
5,258,243 A    11/1993 Cannone

FOREIGN PATENT DOCUMENTS

| EP | 63026948 | 2/1988 |
|---|---|---|
| EP | 607 620 | 7/1994 |
| JP | 59191260 | 10/1984 |

* cited by examiner

Primary Examiner—Mark Ruthkosky
(74) Attorney, Agent, or Firm—Dykema Gossett PLLC (57) ABSTRACT

A seal and bleed valve unit (1, 20) for electric batteries comprising: a tubular neck (2, 21) associated to the cover (C) of the battery and adapted to put the outside in communication with bleed ducts (S) made in the cover (C); an elastic cap (3, 23) consisting of a tubular body (4) closed by a bottom (5) and removably coupled to the outside of the tubular neck (2, 21). The tubular neck (2, 21) ends with a thinner collar (6, 22) relative to the outer surface (2a) of the tubular neck (2, 21), said collar cooperating with the inner surface (7) of the cap (3, 23) to define an annular chamber (8, 24).

13 Claims, 4 Drawing Sheets

SEAL AND BLEED VALVE UNIT FOR ELECTRIC BATTERIES

The present invention relates to a seal and bleed valve unit for electric batteries.

It is known that inside batteries during operation and/or recharge, gases are generated because of the electrolysis and evaporation of water contained in the electrolytic solution that is known to be consisting of sulfuric acid and distilled water.

A particular kind of electric batteries are the so-called recombination batteries in which gases generated in operation are condensed inside the battery avoiding consumption of distilled water and the need to fill them up.

For safety reasons the recombination batteries are provided with a number of channels made in the cover closing the case containing the cells, said channels connecting the electrolytic cells of the battery with a safety valve unit allowing gas bleed to the outside when gas pressure exceeds a predetermined value.

Such a valve unit must also prevent inlet of air into the battery when on cooling temperature and consequently also pressure inside the battery are decreasing. A seal and bleed valve unit for electric batteries of the prior art is shown as an illustrative example in FIG. 1 where it is generally indicated with character A.

Figure 1:
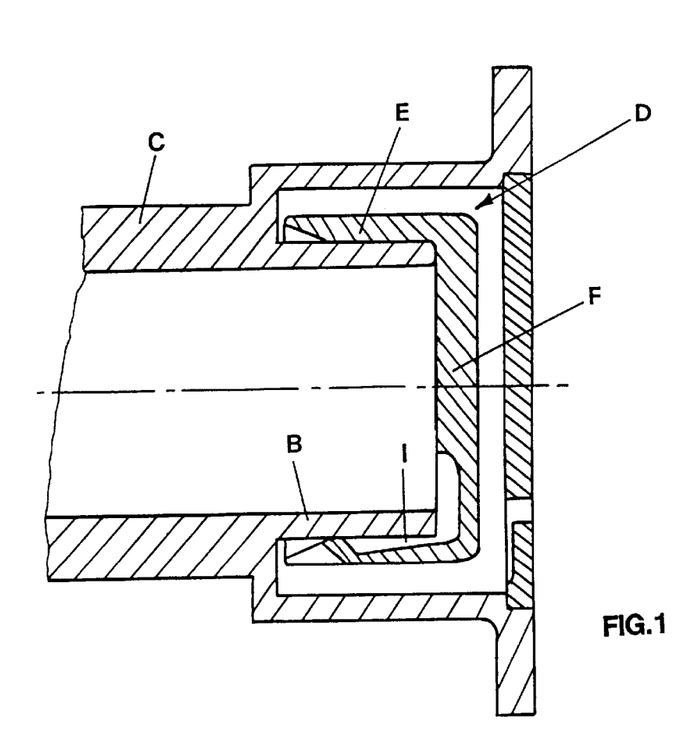
FIGS. 1, 2 and 3 are different views of a seal and bleed valve for batteries belonging to the prior art.

One can see that said unit comprises substantially a tubular neck B projecting from battery cover C and communicating with the inner room of the battery, an elastic cap generally indicated with D and consisting of a tubular body E closed by a bottom F being applied on said collar.

Figure 2:
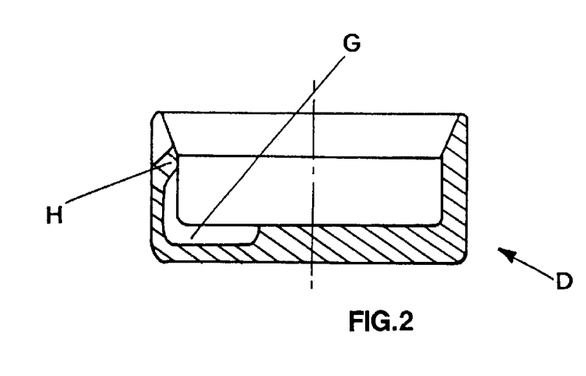
Figure 3:
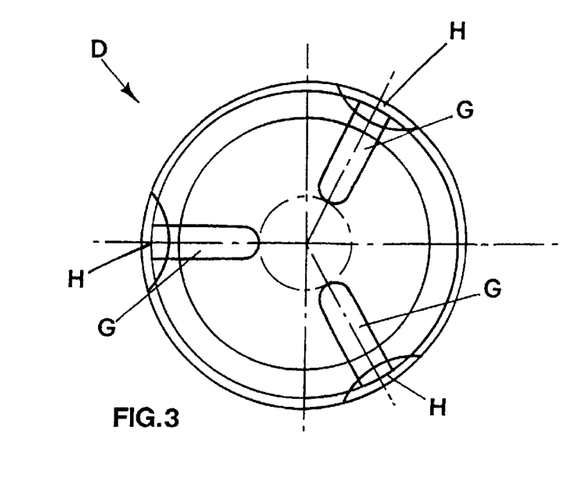

Cap D is shown also in FIGS. 2 and 3 where one can see that the cap is internally provided with three thinned portions G arranged at 120° to each other, each portion being obtained by making part of the tubular body E and also of the bottom F thinner.

The end of the tubular body E at each thinned portion G has a lip H adhering to the tubular neck B to obtain a tight seal.

In the event of excess pressure inside the battery, the generated gas is discharged from inside to the outside through the duct I shown in FIG. 1 created between the tubular neck B and the thinned portion G, causing lip H to rise and therefore discharge of excess pressure to the external ambient.

On the contrary in the event of depression inside the battery, the external pressure forces lips H against the tubular neck B preventing entrance of air inside the battery.

A drawback of the above mentioned valve unit consists in that the small size of the thinned portions G and consequently of the ducts I created between cap and tubular neck B, makes difficult the discharge of excess pressure and the subsequent closure so as to increase inertia of the valve unit reacting rather slowly when pressure inside the battery increases or decreases. This may cause pressure to rise above the maximum admissible values.

Another drawback consists in that the sealing surface is limited only to the contact surface between the tubular body of the cap and the tubular neck and such a surface not always is sufficient to warrant tightness against entrance of air into the battery from the outside when the battery goes into depression.

The above mentioned drawbacks, namely the high inertia of the opening and closing operation to the outside and the limited tightness to the inside, are generally found in a more or less marked way in all the prior art valve units, even if they are constructed differently from the above illustrated and described valve unit.

The present invention aims at overcoming said drawbacks.

More particularly a first object of the invention is to provide a seal and bleed valve unit having an operation inertia when opening which is lower in comparison with equivalent known valve units.

Another object of the invention is a valve unit having a greater tightness when closed in comparison with equivalent known valve units.

Said objects are attained by a seal and bleed valve unit for electric batteries that according to the main claim comprises:

- at least a tubular neck associated to the cover of said battery and adapted to put the external ambient in communication with the bleed ducts made in said cover;
- an elastic cap consisting of a tubular body closed by a bottom, removably coupled to the outside of said tubular neck, and is characterized in that said tubular neck ends with a thinner collar relative to the outer surface of said tubular neck, cooperating with the inner surface of said cap to define an annular chamber.

According to a preferred embodiment, the tubular neck is part of the battery cover being integral with said cover.

The collar made in the tubular neck is tapered with a frustum conical shape and the annular chamber is defined between the outer surface of the collar and the annular intersection zone determined by the contact between the inner surfaces of tubular body and bottom of the cap.

The valve unit is arranged inside a chamber made in the battery cover, said chamber being closed through a plug provided with holes constraining the cap when increase of inner pressure of the battery tends to detach the cap from the tubular neck to which it is coupled.

In the event of excess pressure inside the battery, the elastic cap rises from the tubular neck allowing gas discharge.

On the contrary in the event of battery depression, the atmospheric pressure greater than the inner pressure of the battery, causes the elastic cap to adhere to the tubular neck preventing entrance of air from outside.

According to a constructional variation the tubular neck is part of a plug applied to the battery cover. In this way the entire valve unit can be removed from the battery cover.

Advantageously the annular chamber between the collar of the tubular neck and the elastic cap, allows the pressurized gas generated inside the battery to push radially the tubular body of the cap on the entire circumference at the same time. This makes easier gas discharge to the outside and reduces operation inertia of the valve unit as a whole, so as to avoid dangerous increase of pressure inside the battery during operation.

Still advantageously the collar ensures tightness also against the bottom of the elastic cap, thus warranting a better tightness of the battery to the outside when it goes into depression.

Said objects and advantages will be better understood from the description of a preferred embodiment of the invention that is given as a non-limiting illustrative example making reference to the accompanying sheets of drawings in which.

Figure 4:
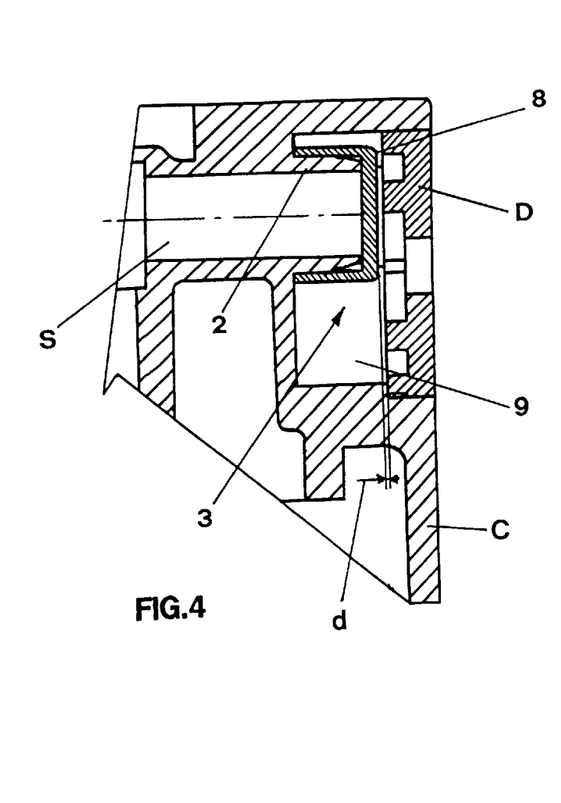
FIG. 4 is a longitudinal sectional view of the valve unit of the invention.
Figure 5:
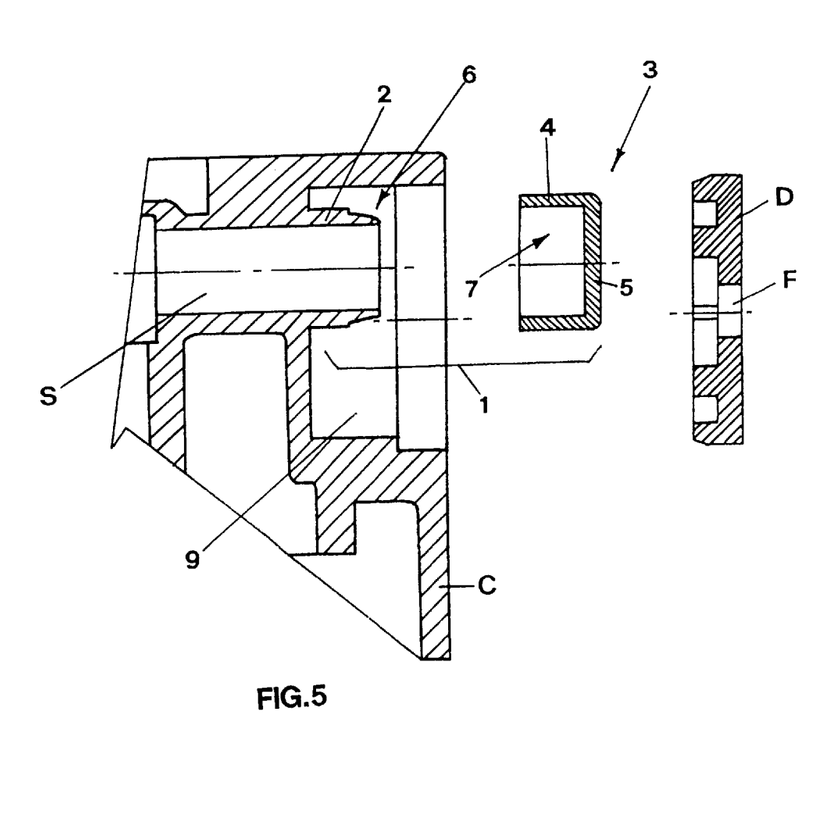
FIG. 5 is an exploded view of the valve unit of FIG. 4.

As shown in FIGS. 4 and 5 the valve unit of the invention generally indicated with reference numeral 1 is applied to the cover C of an electric battery at the end of one or more bleed ducts S connecting the various cells of the battery with the outside.

More particularly the valve unit 1 of the invention comprises a tubular neck 2 made in the cover C of the battery and communicating with the bleed ducts S, to which an elastic cap 3 consisting of a tubular body 4 closed by a bottom 5 is externally and removably coupled.

Figure 6:
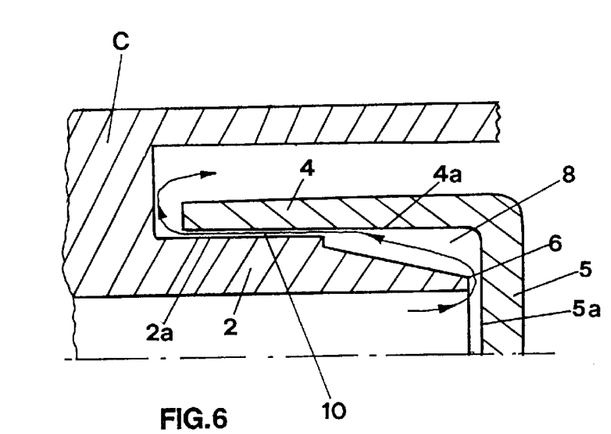
FIGS. 6 and 7 show the valve unit of the invention in two different operation stages.
Figure 7:
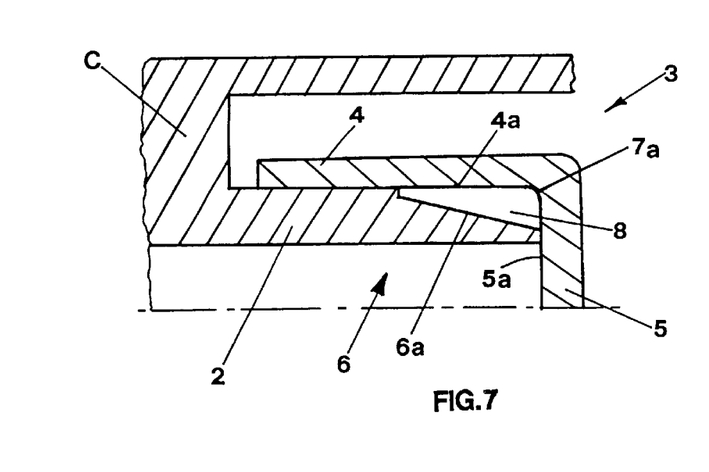

According to the invention the tubular neck 2 ends with a thinner collar relative to the outer surface 2a of said tubular neck 2, said collar cooperating with the inner surface 7 of the elastic cap 3 to define an annular chamber 8 that can be seen in greater detail in FIGS. 6 and 7.

The annular chamber 8 is particularly defined at the intersection zone 7a determined by the contact between the inner surface 4a of the tubular body 4 and the inner surface 5a of the bottom 5 both forming the cap 3.

Figure 8:
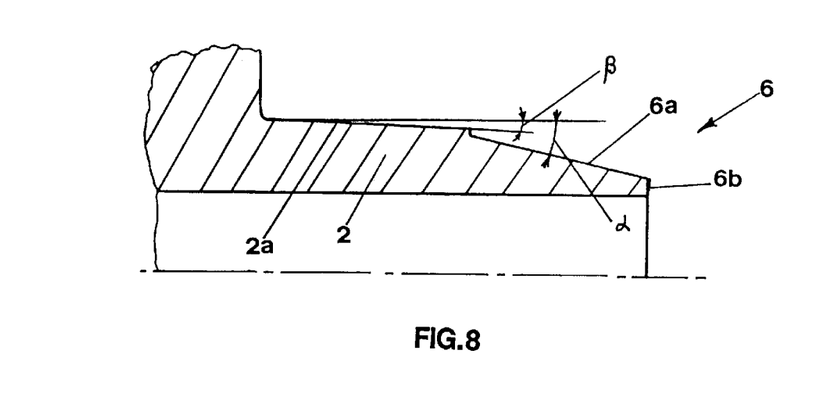
FIG. 8 is an enlarged view of a detail of the valve unit of the invention.

Preferably but not necessarily the collar 6 as shown in FIG. 8 is tapered and has the outer surface 6a inclined at an angle α relative to the outer surface 2a of the tubular neck 2, which is also slightly inclined at an angle β to the collar 6 in order to make easier gas discharge when pressure inside the battery is greater than the outside pressure.

It is to be noted that the valve unit 1 is arranged inside a chamber 9 made in the cover C of the battery and closed through a partition D provided with holes F preventing ejection of the elastic cap 3 in view of the gas pressure inside the battery.

More particularly the partition D is spaced from the elastic cap 3 by the amount d to allow movement of the elastic cap 3 when the gas is discharged.

In operation as shown in FIG. 6, when pressure inside the battery exceeds the predetermined limit, gas contained inside pushes on the inner surface 5a of the bottom 5 of elastic cap 3 and moves it away from the annular end head 6b of the tapered collar 6 so as to enter the annular chamber 8.

Inside the annular chamber 8 the pressurized gas pushes radially to the outside the inner surface 4a of the tubular body 4 moving it away from the outer surface 2a of the tubular neck 2 as shown in FIG. 6 thus forming an annular duct 10 allowing gas to be discharged outside.

On the contrary as shown in FIG. 7, when the battery operation is terminated and is cooled down, the inner pressure decreases until it becomes lower than the outside pressure causing by depression the tubular body 4 to be moved against the outer surface 2a of the tubular neck 2 and the bottom 5 against the annular end head 6b of the tapered collar 6.

In this way a double seal is obtained preventing the external air to enter inside the battery.

Figure 9:
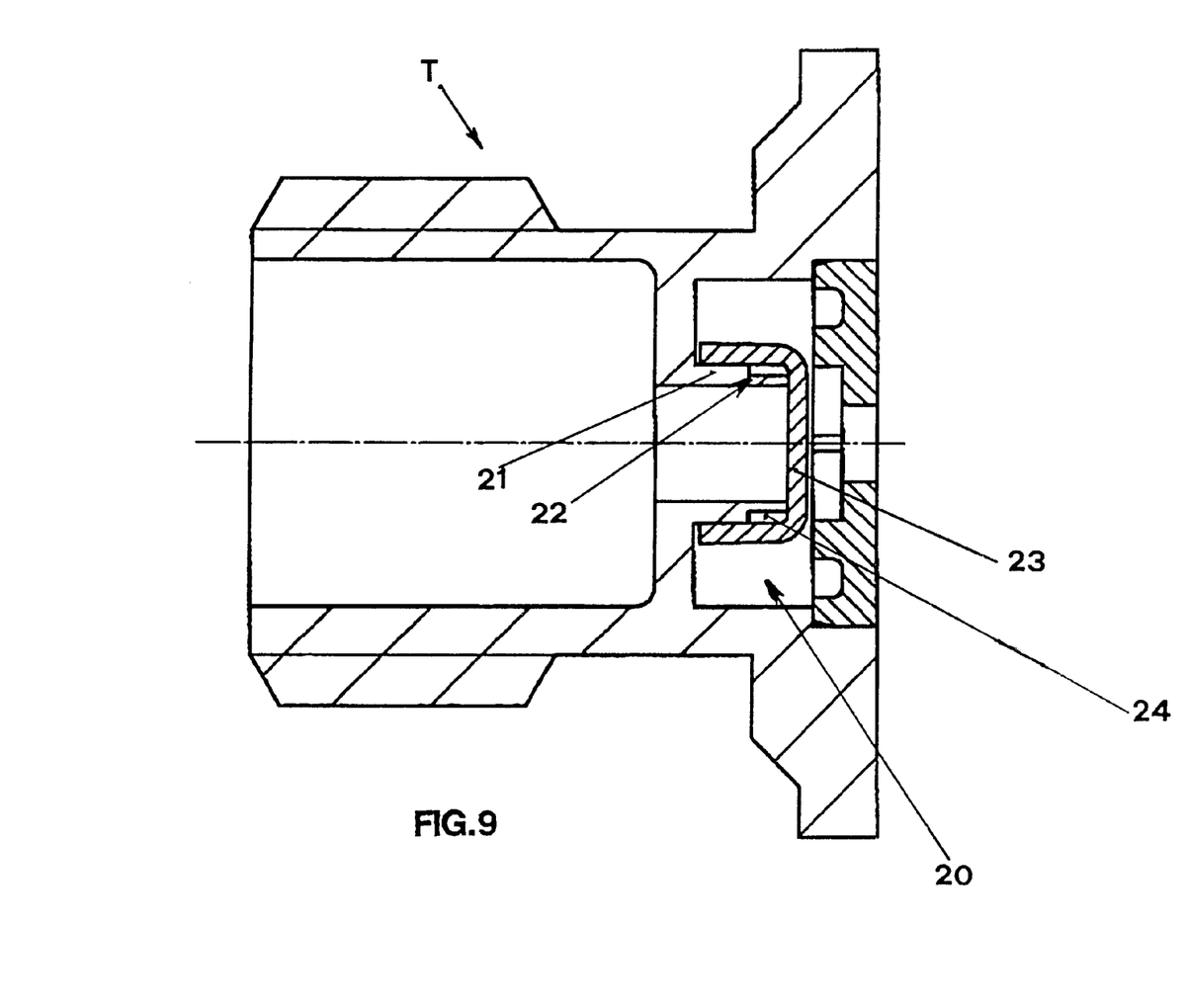
FIG. 9 shows a constructional variation of the valve unit of the invention.

According to a different constructional embodiment shown in FIG. 9, the seal valve unit of the invention, generally indicated with numeral 20, differs from the previously described embodiment because the tubular neck 21 is integral with a plug T removably applied in a corresponding hole made in the battery cover.

The collar 22 of the tubular neck 21 has a cylindrical shape defining with the corresponding cap 23 an annular chamber 24 having the same function described in the previously illustrated embodiment.

In this way the valve unit can be fully removed from the battery cover.

This allows to apply the valve unit of the invention even to battery covers that are not provided with a tubular neck and are made integral with said cover.

From the foregoing it is to be noted that the valve unit of the invention in both illustrated embodiments attains the intended objects.

The described invention may provide for further constructional variations, for instance relating to different shapes of the elastic cap, of the tapered collar and of the tubular neck.

Every variation not shown and possibly not cited should be considered covered by the present invention when falling in the scope of the appended claims.

What is claimed is:

1. A seal and bleed valve unit for electric batteries comprising:

at least a tubular neck associated to the cover (C) of said battery and adapted to put the external ambient in communication with bleed ducts (S) made in said cover (C);

an elastic cap consisting of a tubular body closed by a bottom, removably coupled to the outside of said tubular neck, wherein said tubular neck ends with a thinner collar relative to the outer surface of said tubular neck, said collar cooperating with the inner surface of said cap to define an annular chamber.

2. The valve unit according to claim 1, wherein said annular chamber is defined between the outer surface of said collar and an annular intersection zone determined by contact between the inner surface of the tubular body and the inner surface of the bottom of said elastic cap.

3. The valve unit according to claim 2, wherein said outer surface of said collar is tapered being inclined converging relative to the outer surface of said tubular neck.

4. The valve unit according to claim 2, wherein said outer surface of said collar is cylindrical.

5. The valve unit according to claim 1, wherein said tubular neck is made integral with said cover (C) of said battery.

6. The valve unit according to claim 1, wherein said tubular neck is part of a plug (T) that can be removably coupled to a hole of said battery cover (G).

7. The valve unit according to claim 1, wherein said tubular neck is arranged inside a chamber made in said cover (C) and closed by a partition (D) provided with one or more holes (F).

8. The valve unit according to claim 6, wherein said tubular neck is arranged inside a chamber made in said plug (T).

9. The valve unit according to claim 3, wherein said outer surface of said tubular neck has an inclination (a) directed to said collar.

10. The valve unit according to claim 1, wherein said tubular neck, said thinner collar and said tubular body of said elastic cap have a cross section of circular shape.

11. The valve unit according to claim 1, wherein the inner surface of the tubular body of said elastic cap sealingly cooperates with the outer surface of said tubular neck and the inner surface of the bottom of said elastic cap sealingly cooperates with an annular end head of said collar when pressure inside the battery is lower than the external pressure.

12. The valve unit according to claim 1, wherein the inner surface of the bottom of said elastic cap is spaced from an annular end head of said collar and the inner surface of the tubular body of said elastic cap is spaced from the outers surface of said tubular neck when pressure inside said battery is greater than the external pressure.

13. The valve unit according to claim 7, wherein the outer surface of the bottom of said elastic cap is arranged at a distance (d) from said partition (D).

* * * * *

UNITED STATES PATENT AND TRADEMARK OFFICE
CERTIFICATE OF CORRECTION

PATENT NO.    : 6,645,661 B1
DATED         : October 15, 2002
INVENTOR(S)   : Srinivasan Babu et al.

It is certified that error appears in the above-identified patent and that said Letters Patent is hereby corrected as shown below:

Title page,
Item [73], Assignee, "Agouron Pharmaceuticals, Inc., La Jolla, CA (US)" should read
-- Agouron Pharmaceuticals, Inc., La Jolla, CA (US), and Japan Tobacco Inc., Osaka (JP) --

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,645,661 B1
DATED        : October 15, 2002
INVENTOR(S)  : Srinivasan Babu et al.

It is certified that error appears in the above-identified patent and that said Letters Patent is hereby corrected as shown below:

<u>Title page,</u>
Item [73], Assignee, "Agouron Pharmaceuticals, Inc., La Jolla, CA (US)" should read -- Agouron Pharmaceuticals, Inc., La Jolla, CA (US), and Japan Tobacco Inc., Osaka (JP) --.

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,645,661 B1
DATED : October 15, 2002
INVENTOR(S) : Srinivasan Babu et al.

It is certified that error appears in the above-identified patent and that said Letters Patent is hereby corrected as shown below:

Title page,
Item [73], Assignee, "Agourin Pharmaceuticals, Inc., La Jolla, CA (US)" should read -- Agouron Pharmaceuticals, Inc., La Jolla, CA (US), and Japan Tobacco Inc., Osaka (JP) --.

Signed and Sealed this

Eighth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,645,661 B2
DATED         : November 11, 2003
INVENTOR(S)   : Franco Stocchiero It is certified that error appears in the above-identified patent and that said Letters Patent is hereby corrected as shown below:

This certificate supersedes Certificate of Correction issued May 18, 2004, the number was erroneously mentioned and should be vacated since no Certificate of Correction was granted.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,645,661 B2
DATED : November 11, 2003
INVENTOR(S) : Franco Stocchiero It is certified that error appears in the above-identified patent and that said Letters Patent is hereby corrected as shown below:

This certificate supersedes Certificate of Correction issued June 8, 2004, the number was erroneously mentioned and should be vacated since no Certificate of Correction was granted.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,645,661 B1
DATED : October 15, 2002
INVENTOR(S) : Srinivasan Babu et al.

It is certified that error appears in the above-identified patent and that said Letters Patent is hereby corrected as shown below:

Title page,
Item [73], Assignee, "Agouron Pharmaceuticals, Inc., La Jolla, CA (US)" should read -- Agouron Pharmaceuticals, Inc., La Jolla, CA (US), and Japan Tobacco Inc., Osaka (JP) --.

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,645,661 B2
DATED : November 11, 2003
INVENTOR(S) : Franco Stocchiero It is certified that error appears in the above-identified patent and that said Letters Patent is hereby corrected as shown below:

This certificate supersedes Certificate of Correction issued March 22, 2005. The certificate was issued in error and should be deleted.

Signed and Sealed this

Tenth Day of May, 2005

JON W. DUDAS
*Director of the United States Patent and Trademark Office*